(No Model.)

R. P. SCOTT.
PNEUMATIC TIRE.

No. 534,762. Patented Feb. 26, 1895.

WITNESSES:
Chas Bert
J. W. Gander

INVENTOR,
Robert P. Scott

UNITED STATES PATENT OFFICE.

ROBERT P. SCOTT, OF CADIZ, OHIO.

PNEUMATIC TIRE.

SPECIFICATION forming part of Letters Patent No. 534,762, dated February 26, 1895.

Application filed January 7, 1895. Serial No. 534,027. (No model.)

*To all whom it may concern:*

Be it known that I, ROBERT P. SCOTT, a citizen of the United States, residing at Cadiz, Harrison county, Ohio, have invented a new and Improved Pneumatic Tire, of which the following is a description.

The objects of my invention are to produce an inflatable, detachable pneumatic tire in which the parts can be assembled ready for inflation when off the rim and then be slipped bodily upon the rim, the subsequent inflation of the tire holding it firmly in place and further to produce a tire which shall, when placed upon a wooden rim, have no tendency to split the same. This splitting of wood rims by detachable pneumatic tires is the greatest objection to their use on such rims and is one which my invention completely avoids. I accomplish these objects by a shoe, which may have extensible wire selvages, hooks or the like alternately arranged on the opposite selvages and an endless wire engaging the hooks, the inflation of the shoe, preferably by an inner tube, causing the endless wire to be distorted into a zig-zag line, thus reducing its effective diameter and pressing it below the edges of the peripheral groove in the wheel rim and preferably against the base of the groove.

Figure 1:
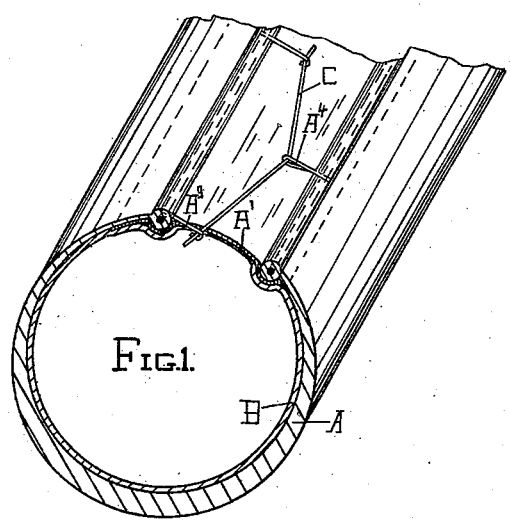
Figure 2:
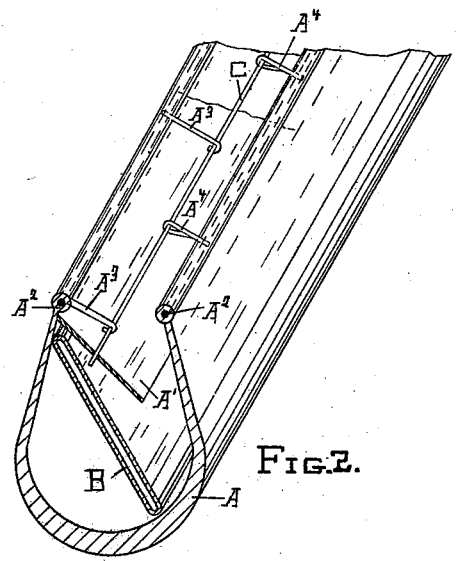
Figure 3:
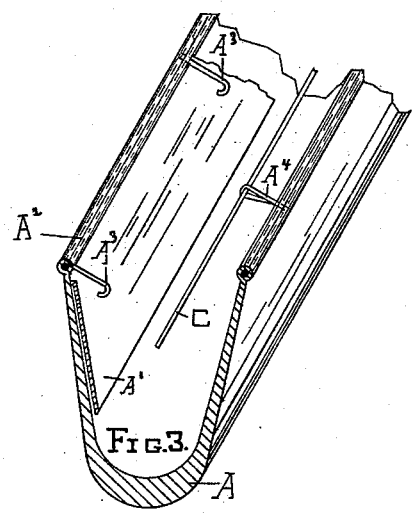
Figure 4:
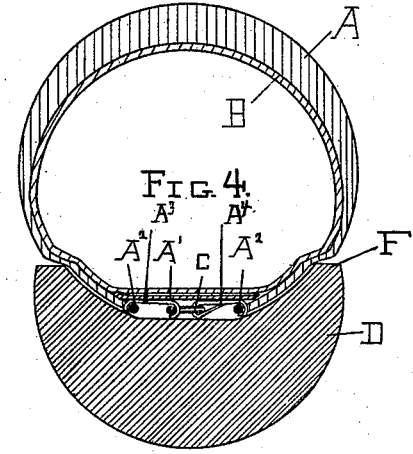

In the drawings, Figure 1 is a perspective of a portion of the tire as it appears when blown up; Fig. 2, a perspective of a portion deflated; Fig. 3, a perspective of a portion of the outer shoe, and Fig. 4 a section of the tire on the rim.

In the drawings, the outer shoe A has in its selvages the wires $A^2$ which are preferably not soldered at their ends to make a complete ring but are extensible. They may however, if of the exactly proper size, be made endless. On one of these selvages are fastened open hooks $A^3$ or the like and on the opposite selvage the preferably closed hooks $A^4$, links or the like are attached. The endless ring C of wire or the like is preferably permanently secured to the shoe by passing inside of the closed hooks or links $A^4$ on one of the selvages. In the uninflated state of the tire, this endless ring C is substantially a circle and not staggered.
The rim D preferably of wood may have a peripheral groove below the rim edges F. Normally the diameter of the circle of the rim edge F is of such size with respect to the diameter of the undistorted endless circular wire C, that the endless wire can be readily slipped onto the rim. A flap A′ secured to one edge of the shoe protects the inner tube from the hooks.

To attach the tire, the inner tube B is placed inside the shoe, the hooks $A^3$ are passed over the endless ring C, thus forming a complete structure of inner tube, shoe, hooks and endless wire. This structure is slipped bodily over the wheel rim which is possible since the ring diameter is normally greater than the diameter of the rim edges F. Upon inflation of the inner tube, the alternately arranged hooks $A^3$, $A^4$ acting as distorting devices forcibly draw the ring C into a zig-zag line, thus reducing its diameter below that of the rim edge F and holding the tire in place. The inflation will also preferably be sufficient to forcibly press the zig-zag ring against the bottom of the groove in the wheel rim which pressure in itself may be sufficient to hold the tire in place.

It will be noticed that the hooks $A^3$, $A^4$ hold the selvages $A^2$ together so that they can exert no lateral pressure against the flanges of the wheel rim to cause a splitting of the rim. The fact that all the parts of the structure of the tire can be assembled off the wheel rim is also a great advantage since it avoids the otherwise necessary manipulation of the parts of the tire when in place on the rim.

What I claim is—

1. A detachable, inflatable pneumatic tire comprising a shoe, an endless ring and distorting devices on the shoe actuated by the inflation of the tire for reducing the effective diameter of the ring, substantially as described.

2. The combination of a peripherally grooved wheel rim, and an inflatable, detachable pneumatic tire comprising an endless ring of a diameter sufficient to be slipped over the rim edge and distorting devices actuated by the inflation of the shoe for reducing the effective diameter of the ring, substantially as described.

3. A detachable, inflatable pneumatic tire comprising an endless ring, a shoe, extensible wire selvages therein and distorting devices on the selvages actuated by the inflation of the tire for reducing the effective diameter of the ring, substantially as described.

4. A detachable, inflatable pneumatic tire comprising an endless ring, a shoe, open hooks on one selvage of the shoe and alternately arranged, closed hooks on the other selvage of the shoe having the endless ring passing therethrough, the inflation of the tire causing the ring to zig-zag thus reducing its effective diameter, substantially as described.

ROBERT P. SCOTT.

Witnesses:
  THOS. KELL BRADFORD,
  SAML. D. BRADFORD.